Jan. 16, 1934.   R. A. GOEPFRICH   1,944,136
BRAKE
Filed May 16, 1929

INVENTOR
RUDOLPH A. GOEPFRICH
BY H. O. Clayton
ATTORNEY

Patented Jan. 16, 1934

1,944,136

UNITED STATES PATENT OFFICE 1,944,136

BRAKE

Rudolph A. Goepfrich, South Bend, Ind.

Application May 16, 1929. Serial No. 363,435

9 Claims. (Cl. 188—78)

This invention relates to brakes and is illustrated as embodied in an automotive brake of the internal expanding type.

An object of the invention relates to the provision of a very simple and efficient operating mechanism for the brake wherein adjacent ends of a movable friction means are spaced apart by a wedge member movable laterally of the brake to force said ends into drum engagement.

According to a further feature of the invention, motion may be imparted to said wedge member by a lever-actuated multiple thread screw, said lever being housed by a bracket member secured to a brake support plate by pins extended to form supports for the friction means of the brake.

Figure 1:
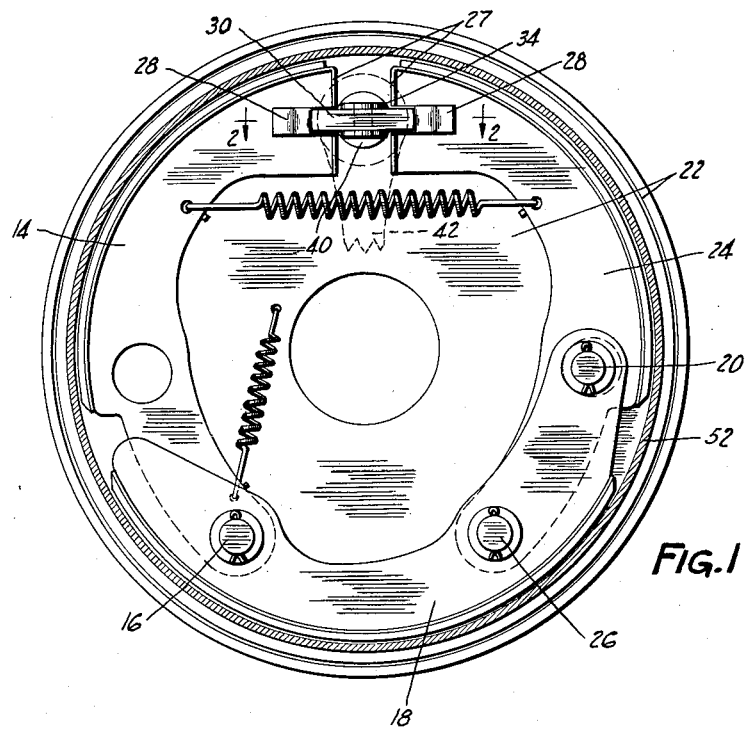
Figure 2:
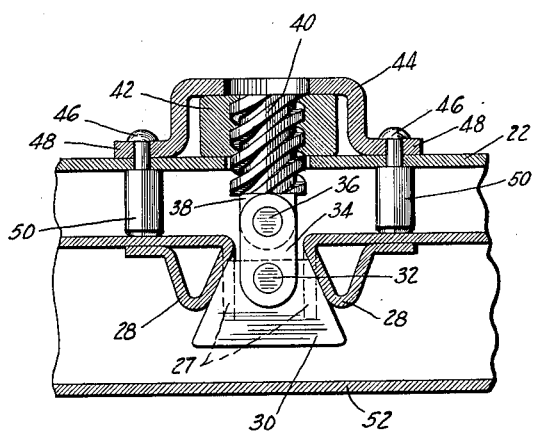

Further features of the invention, including a novel friction element construction serving as a guide and support means for the aforementioned wedge and other desirable details of construction and combinations of parts will become apparent from the following detailed description of a preferred embodiment of my invention, which embodiment is illustrated in detail in the accompanying drawing, in which:

Figure 1 is a vertical sectional view taken through the brake drum just inside the head thereof and illustrating the brake details in side elevation; and Figure 2 is an enlarged sectional view of my novel operating means taken on the line 2—2 of Figure 1.

In that embodiment of my invention selected for illustration, there is provided a three shoe brake of a left front wheel primary shoe 14 being pivotally connected by a floating pivot 16 to a secondary shoe 18, the latter anchored at 20 to the brake supported plate 22. An auxiliary shoe 24 overlapped at its end by the bifurcated end of shoe 18 is anchored at 26 to an anchor post also secured to said support plate. This particular type of brake is more completely described in the patent to Dodge No. 1,659,545 dated February 14, 1928 and forms no part of the present invention.

The principal feature of the invention resides in the novel operating means for applying the aforementioned brake shoes or an equivalent friction device into drum engagement. As clearly disclosed in Figure 2, the ends of the friction device are spaced apart and preferably provided with oppositely inclined wedge faces. As here disclosed there is provided a friction means having relatively thin spaced apart web members extending parallel to the support plate and which members are, at their ends, laterally flanged at 27. Intermediate the spaced flanges 27 of each web there is provided a triangular shaped thrust member 28 turned back from the material of the web.

The operating means of the brake preferably comprises a solid wedge-shaped cam 30 pivotally connected at 32 to the bifurcated end of a tension link 34, the latter pivotally connected at 36 to the stub end 38 of a multiple thread screw 40 passing through an opening in the support plate 22. Screw 40 is preferably actuated by a control lever 42, internally threaded to mesh with the screw 40, and housed by a channel-shaped thrust bracket 44. Pins 46 passed through flanges 48 on the bracket and through the support plate 22 serve to secure the bracket rigidly in place. The pins are also preferably extended within the brake to form projections 50 serving as lateral guide supports or so-called "steady rests" for the sides of the expansible friction means.

In operation rotation of the control lever 42 functions to impart a plain or translatory motion to the screw resulting in drawing the wedge cam outwardly to spread the friction means into contact with the drum 52. My novel operating means is shown in combination with a three shoe self-energizing type of brake, but it is equally applicable to the "double wrapping" type wherein the friction means shifts its anchorage with reversal of drum rotation. With either type of brake I prefer to construct the guide flange 27 extending laterally of the plane of the friction means, which flanges form a combined support and guide for the movable wedge cam.

While one illustrative embodiment has been described in detail, it is not my intention to limit the scope of the invention to that particular embodiment, or otherwise than by the terms of the appended claims.

I claim:

1. Operating mechanism for a brake of the internal expanding type comprising a floating wedge member and means for imparting a lineal movement thereto comprising a lever actuated screw member pivotally connected to said wedge member, together with a channel-shaped bracket member surrounding said lever and screw to house the same.

2. A brake structure characterized by a friction device having spaced apart ends, each of said ends having face portions lying in a plane substantially normal to the plane of the friction device, together with a face portion inclined to the plane of the friction device.

3. A brake structure characterized by a friction device having spaced apart ends, each of said ends having face portions lying in a plane substantially normal to the plane of the friction device, together with a face portion inclined to the plane of the friction device, in combination with a cam member having inclined sides to contact said inclined face portions.

4. A brake structure characterized by a friction device having spaced apart ends, each of said ends having face portions lying in a plane substantially normal to the plane of the friction device, together with a face portion inclined to the plane of the friction device, in combination with a cam member having inclined sides to contact said inclined face portions, said cam being supported and guided by said first-mentioned face portions.

5. A brake comprising a drum, internal expanding friction means having separable ends, a wedge movable axially of the drum and engaging said ends to apply the brake, and means for moving said wedge comprising coacting internal and external threaded members.

6. A brake comprising a drum, internal expanding friction means cooperating therewith and having separable ends, a wedge movable axially of the drum and engaging said ends to apply the brake, a threaded shaft secured to the wedge, an internally threaded member engaging the shaft, means preventing rotation of the shaft, means preventing movement of the internally threaded member axially of the drum, and means to rotate the member and move the wedge.

7. A brake comprising a backing plate, a drum, brake shoes having separable ends formed with inclined surfaces, a wedge movable axially of the drum and engaging said surfaces to apply the brakes, a threaded shaft pivotally secured to the wedge, an internally threaded member engaging the shaft and projecting parallel to the plane of the backing plate and closely adjacent thereto, and means preventing movement of the internally threaded member axially of the drum.

8. A brake comprising a plate having friction means thereon formed with separable ends, applying means movable axially of the brake between said ends and extending through said plate, a housing for a portion of said means on the outer side of said plate, and devices securing said housing to the plate and which devices have portions supporting the friction means against the axial thrust of the applying means.

9. A brake comprising friction means having separable ends and an applying device movable between said ends in operative wedging engagement therewith, said ends having webs provided with integral wedge portions formed for operative engagement with the applying device and other integral lateral tongue portions supporting the applying device by engagement with its sides.

RUDOLPH A. GOEPFRICH.

CERTIFICATE OF CORRECTION.

Patent No. 1,944,136.  January 16, 1934.

RUDOLPH A. GOEPFRICH.

It is hereby certified that the above numbered patent was erroneously issued to the inventor said "Goepfrich" whereas said patent should have been issued to Bendix Brake Company, of South Bend, Indiana, a corporation of Illinois, as assignee of the entire interest in said invention as shown by the records of assignments in this office; page 1, line 38, for "supported" read support; and that the said Letters Patent should be read with these corrections therein that the same may conform to the record of the case in the Patent Office.

Signed and sealed this 20th day of February, A. D. 1934.

(Seal)

F. M. Hopkins
Acting Commissioner of Patents.